(12) United States Patent
Ishikawa et al.

(10) Patent No.: US 6,942,048 B2
(45) Date of Patent: Sep. 13, 2005

(54) ACCESSORY DRIVE APPARATUS

(75) Inventors: Tetsuhiro Ishikawa, Aichi-ken (JP); Shoichi Sasaki, Okazaki (JP); Sumikazu Shamoto, Nagoya (JP); Hiroshi Sugiura, Kariya (JP); Yukio Inaguma, Aichi (JP); Kazunari Moriya, Aichi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/079,887

(22) Filed: Feb. 22, 2002

(65) Prior Publication Data

US 2002/0153180 A1 Oct. 24, 2002

(30) Foreign Application Priority Data

Feb. 22, 2001 (JP) .......................................... 2001-046376

(51) Int. Cl.⁷ ................................................. B60K 1/00
(52) U.S. Cl. .......................................... 180/65.3; 429/13
(58) Field of Search .......................... 429/13; 318/139; 477/3, 4; 475/5, 1; 180/65.1, 65.2, 65.3, 65.4, 65.6, 65.7; 60/609; 123/559.1, 559.2, 562

(56) References Cited

U.S. PATENT DOCUMENTS

| | | | | | |
|---|---|---|---|---|---|
| 2,331,784 | A | * | 10/1943 | Keller | 123/69 R |
| 4,632,205 | A | * | 12/1986 | Lewis | 180/165 |
| 4,914,983 | A | * | 4/1990 | Simonyi et al. | 477/154 |
| 5,433,282 | A | * | 7/1995 | Moroto et al. | 180/65.2 |
| 5,492,189 | A | * | 2/1996 | Kriegler et al. | 180/65.2 |
| 5,646,852 | A | * | 7/1997 | Lorenz et al. | 701/103 |
| 5,662,184 | A | * | 9/1997 | Riemer et al. | 180/65.1 |
| 5,780,981 | A | * | 7/1998 | Sonntag et al. | 318/139 |
| 5,826,671 | A | * | 10/1998 | Nakae et al. | 180/65.2 |
| 5,877,600 | A | * | 3/1999 | Sonntag | 318/139 |
| 6,058,916 | A | * | 5/2000 | Ozawa | |
| 6,170,587 | B1 | * | 1/2001 | Bullock | 180/69.6 |
| 6,328,122 | B1 | * | 12/2001 | Yamada et al. | 180/65.3 |
| 6,878,082 | B2 | * | 4/2005 | Seungpyo | 474/109 |
| 2002/0064697 | A1 | * | 5/2002 | Sugiura et al. | 429/23 |
| 2003/0146026 | A1 | * | 8/2003 | Enjoji et al. | 180/65.1 |
| 2004/0254045 | A1 | * | 12/2004 | McGee et al. | 477/3 |

FOREIGN PATENT DOCUMENTS

| | | |
|---|---|---|
| DE | 43 22 765 | 6/1994 |
| DE | 44 12 451 | 9/1995 |
| DE | 100 01 436 | 8/2000 |
| EP | 0711981 | * 10/1995 |
| JP | 6-229447 | 8/1994 |
| JP | 797939 | * 4/1995 |
| JP | 7-195955 | 8/1995 |
| JP | 7269365 | * 10/1995 |
| JP | 9-205701 | 8/1997 |
| JP | 11280481 | * 10/1999 |

* cited by examiner

Primary Examiner—Bryan Fischmann
(74) Attorney, Agent, or Firm—Oblon, Spivak, McClelland, Maier & Neustadt, P.C.

(57) ABSTRACT

An accessory drive apparatus includes a power source, an accessory system that provides an input to the power source, an accessory driving source that drives the accessory system, and a power combination/distribution mechanism that is connected to the power source and the accessory system to transmit power from both the power source and the accessory driving source to the accessory system. With this arrangement, the accessory system is driven by a combination of power received from the accessory driving source and the power source.

8 Claims, 4 Drawing Sheets

ACCESSORY DRIVE APPARATUS

INCORPORATION BY REFERENCE

The disclosure of Japanese Patent Application No. 2001-046376 filed on Feb. 22, 2001, including the specification, drawings and abstract, is incorporated herein by reference in its entirety.

BACKGROUND OF THE INVENTION

1. Field of the Invention

The invention relates to an accessory drive apparatus, and more particularly to a driving mechanism for an accessory system for driving a power source, such as a fuel cell system.

2. Description of Related Art

Japanese Laid-open Patent Publication No. 6-229447 discloses a transmission device for transmitting rotary power of an engine to an engine accessory while changing the speed of rotation, so as to drive the engine accessory. The transmission device disclosed in this publication includes a hollow rotating member, a first gear, a second gear, and a clutch. The hollow rotating member, which is rotatably supported on a drive shaft of the accessory, has an input engaging portion formed at an outer circumferential surface thereof, and a planetary gear rotatably attached to an inner circumferential surface thereof. In operation, the rotary power is transmitted from the engine to the input engaging portion of the hollow rotating member. The first gear is fixedly attached to the drive shaft of the accessory, and meshes with the planetary gear in the hollow rotating member. The second gear is freely rotatably attached to the drive shaft of the accessory, and meshes with the planetary gear in the hollow rotating member. The clutch engages/disengages a stationary or fixed portion of the accessory with/from the second gear, so as to apply braking force to the second gear. When the clutch is in the released or unengaged state, rotation of the second gear is not restricted, and only the revolution of the planetary gear around the drive shaft contributes to rotation of the hollow rotating member, whereby the accessory rotates at the same speed in the same direction as the hollow rotating member. When the clutch is in the engaged state, on the other hand, rotation of the second gear is restricted, and the first gear is rotated at an increased rotational speed achieved by adding the rotation of the planetary gear on its own axis to the revolution thereof around the drive shaft of the accessory. As a result, the accessory rotates at an increased speed as compared with the speed of rotation of the hollow rotating member. By suitably controlling the engaging state of the clutch, therefore, the rotational speed of the accessory can be controlled as desired.

In the above-described arrangement in which the driving force applied to the accessory is controlled or adjusted by means of the clutch, loss of power is caused by so-called clutch slipping when the clutch is in an intermediate slipping state between a fully engaged position and a fully released position, resulting in a reduced efficiency in driving the accessory.

Another driving source may be installed for driving an accessory or accessories. In this case, however, the driving source must be large-sized so as to provide sufficiently large power or driving force, resulting in an increased cost. In particular, while fuel-cell vehicles have been increasingly developed in recent years, a system for driving an accessory or accessories for a fuel cell system, which requires a large number of motors and inverters, is undesirably large-sized and complicated in construction. Thus, it has been considered important to simplify the system for driving the accessory.

SUMMARY OF THE INVENTION

It is one object of the invention to provide an accessory drive apparatus with which an accessory driving system can be simplified, and the cost of the system can be reduced.

To accomplish the above and/or other objects, there is provided an accessory drive apparatus according to the invention, which includes a power source, an accessory system connected to provide an input to the power source, an accessory driving source, and a power combination/distribution mechanism that is connected to the power source and the accessory system, wherein the power combination/distribution mechanism is adapted to transmit power to the accessory system from both the power source and the accessory driving source, so that the accessory system is driven by a combination of power received from the accessory driving source and the power source.

In one preferred embodiment of the invention, a planetary gear unit including a sun gear, a carrier and a ring gear may be used as the power combination/distribution mechanism. In this case, the accessory driving source or the accessory system is connected to the sun gear, and a part of the power from the power source is transmitted to the carrier, while the accessory system or the accessory driving source is connected to the ring gear.

In another preferred embodiment of the invention, the power source includes a fuel cell system and a drive motor coupled to the fuel cell system, and the accessory system includes a pump that supplies a fuel gas to the fuel cell system, while the accessory driving source includes a motor that drives the pump. With this arrangement, a part of an output of the drive motor is transmitted to the power combination/distribution mechanism.

In a further embodiment of the invention, a differential gear unit or assembly may be used as the power combination/distribution mechanism.

With the accessory drive apparatus constructed as described above, a part of the power received from the power source is used for driving the accessory system, so that less power must be generated by the accessory driving source for driving the accessory system. For example, a planetary gear unit serving as the power combination/distribution mechanism is favorably used for transmitting a part of the power from the power source to the accessory system, whereby the accessory system can be highly efficiently driven with almost no transmission loss. Furthermore, required power to be generated by the accessory driving source is reduced, so that the accessory driving source can be made compact or simplified. While any device may be used as the accessory driving source, a typical example thereof is a motor.

When the planetary gear unit is in a steady-state operation, a relationship that the torque of the carrier is greater than that of the ring gear and the torque of the ring gear is greater than that of the sun gear is generally established. By connecting the auxiliary drive source to the sun gear and transmitting power from the power source to the carrier, therefore, the torque of the auxiliary driving source can be reduced. For example, the power of the power source may used for running a motor vehicle, as well as driving the auxiliary system.

BRIEF DESCRIPTION OF THE DRAWINGS

The foregoing and/or further objects, features and advantages of the invention will become more apparent from the following description of a preferred embodiment with reference to the accompanying drawings, in which like numerals are used to represent like elements and wherein.

DETAILED DESCRIPTION OF PREFERRED EMBODIMENTS

An exemplary preferred embodiment of the invention, when it is employed in a fuel-cell vehicle, will be hereinafter described with reference to the drawings.

Figure 1:
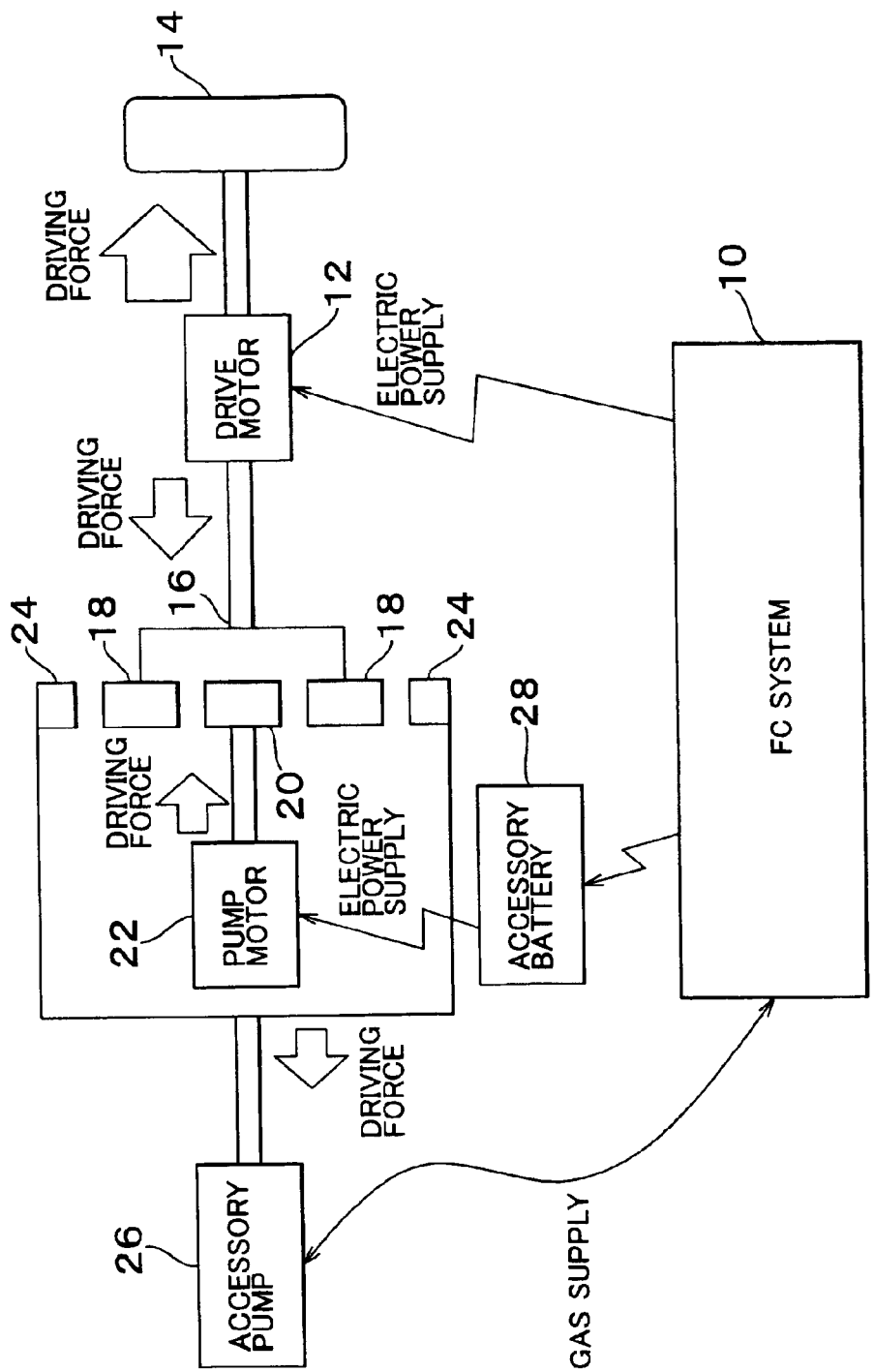
FIG. 1 is a view showing the construction of a principal part of a fuel-cell vehicle equipped with an accessory drive apparatus according to one preferred embodiment of the invention.

FIG. 1 illustrates a principal part of a fuel-cell vehicle equipped with an accessory drive apparatus according to the preferred embodiment of the invention. A fuel cell system (FC) 10 installed on the vehicle is operable to supply electric power required for running the vehicle to a drive motor 12. An output shaft of the drive motor 12 is connected to vehicle wheels 14, and is also connected to a carrier 16 of a planetary gear unit. With this arrangement, driving force or power generated by the drive motor 12 is transmitted to the wheels 14, and is also transmitted to the planetary gear unit.

The planetary gear unit includes the carrier 16, a pinion gear 18 provided on the carrier 16, a sun gear 20, and a ring gear 24. The sun gear 20 and the pinion gear 18, and the ring gear 24 and the pinion gear 18, respectively engage or mesh with each other. The sun gear 20 is supported to be freely rotatable about a center axis of the gear unit, and the pinion gear 18 is supported such that it rotates on its axis while revolving around the sun gear 20, while the ring gear 24 is supported to be freely rotatable about the same center axis of the gear unit.

As described above, a part of the driving force or power generated by the drive motor 12 is transmitted to the pinion gear 18 of the planetary gear unit. On the other hand, a pump motor 22 serving as an accessory driving source is connected to the sun gear 20 of the planetary gear unit, as shown in detail in FIG. 2. In addition, an accessory pump 26 for supplying a fuel gas to the fuel cell system 10 is connected to the ring gear 24 of the planetary gear unit. The pump motor 22 is driven with electric power supplied from an accessory battery 28.

In the accessory drive apparatus as described above, the pump motor 22 alone may be driven to rotate the sun gear 20, thereby to rotate the pinion gear 18 and the ring gear 24, so that the accessory pump 26 can operate to supply fuel gas to the fuel cell system 10. In this case, however, the size of the pump motor 22 serving as a single driving source needs to be large enough to provide the accessory pump 26 with required power.

In the present embodiment, therefore, a part of the driving force of the drive motor 12 is supplied to the carrier 16 of the planetary gear unit, so as to be added to torque generated by the pump motor 22. With this arrangement, a load of the pump motor 22 can be advantageously reduced.

An operation of the embodiment will be hereinafter described in detail.

The accessory pump 26 operates substantially in accordance with the vehicle speed, and can be thus linked to the output shaft of the drive motor 12 that controls the vehicle speed. This is a precondition for control as described below. Various symbols used in the following description are defined as follows:

| | |
|---|---|
| S: | sun gear |
| C: | carrier |
| R: | ring gear |
| $M_t$: | load motor (i.e., drive motor) |
| $M_p$: | drive motor for air pump (i.e., accessory pump) |
| P: | air pump (i.e., accessory pump) |
| W: | output shaft of load motor (i.e., drive motor) |
| $\omega_S$: | angular velocity of sun gear |
| $\omega_C$: | angular velocity of carrier |
| $\omega_R$: | angular velocity of ring gear |
| $\tau_S$: | torque applied to sun gear |
| $\tau_C$: | torque applied to carrier |
| $\tau_R$: | torque applied to ring gear |
| $P_{P1}$: | power required for driving air pump (or accessory pump) |
| $\omega_{P1}$: | angular velocity of pump at $P_{P1}$ |
| $\tau_{P1}$: | load torque applied to pump at $P_{P1}$ |
| $\alpha$: | proportional coefficient of $\tau_{P1}$ with respect to $\omega_{P1}$ |
| $\omega_{C1}$: | angular velocity of load motor (or drive motor) |

When the planetary gear unit is in a steady-state operation, the following relationships (1), (2) are established.

$$\tau_C > \tau_R > \tau_S \quad (1)$$

$$\omega_R > \omega_C > \omega_S \quad (2)$$

Figure 2:
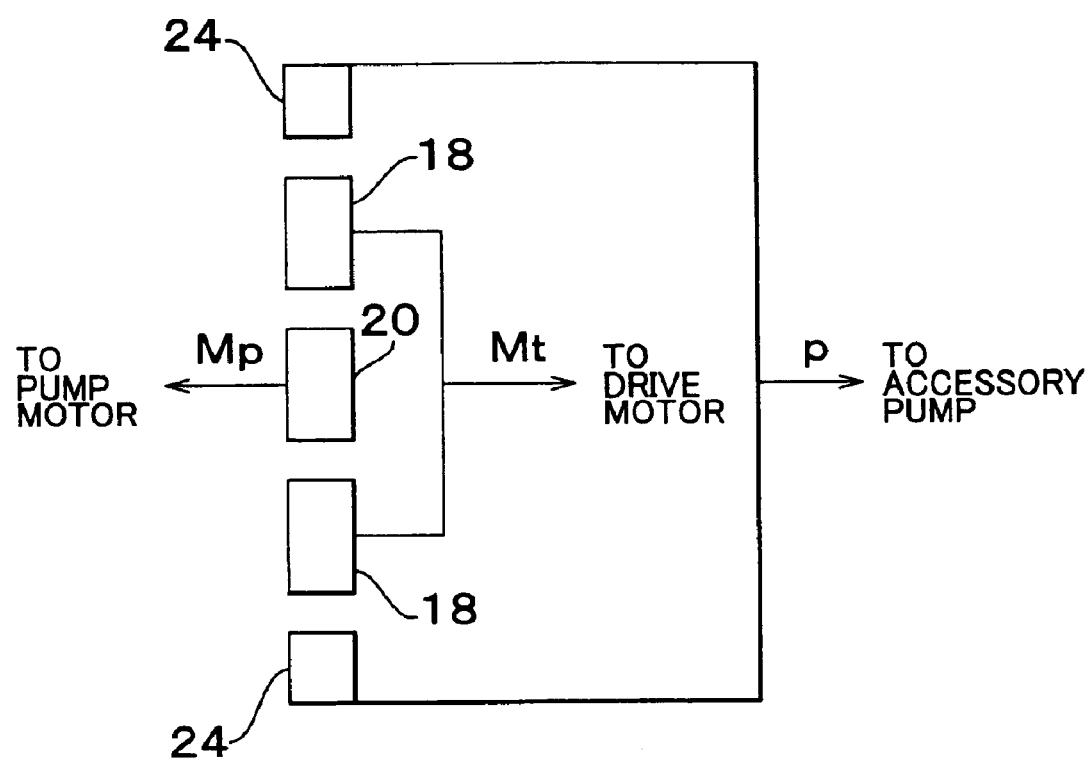
FIG. 2 is a view showing the construction of a planetary gear unit of the accessory drive apparatus of FIG. 1.
Figure 3:
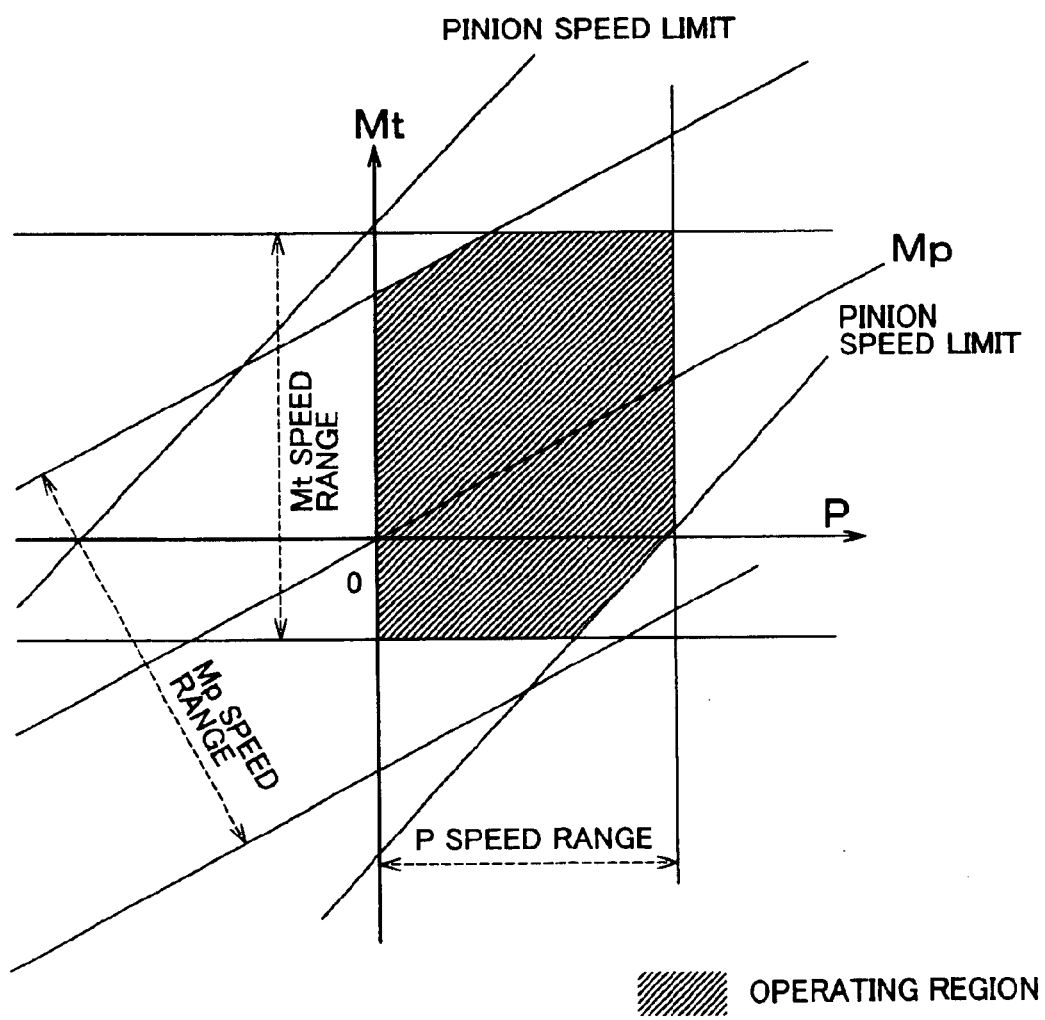
FIG. 3 is a view for explaining an operating region of the planetary gear unit.

FIG. 3 is a chart showing limits of the rotational speeds of respective components of the planetary gear unit as shown in FIG. 2. In FIG. 3, the horizontal axis P represents the speed of the accessory pump (air pump) 26, and the vertical axis $M_r$ represents the speed of the drive motor (load motor) 12. A hatched area in FIG. 3 represents an operating region of the planetary gear unit, which region is defined by operating ranges of the pump motor (air pump) 22 that drives the sun gear 20, the drive motor (load motor) 12 that drives the pinion gear 18, and the accessory pump 26 connected to the ring gear 24.

If the gear ratio ρ is defined as the ratio of the number of gear teeth of the sun gear to the number of gear teeth of the ring gear, the torque relationship among the gears and carrier in a steady-state operation of the planetary gear unit is represented by:

$$\tau_R = -\frac{1}{1+\rho}\tau_C \quad (3)$$

$$\tau_S = -\frac{\rho}{1+\rho}\tau_C \quad (4)$$

In the meantime, the relationship of the rotational speeds of the sun gear, the ring gear and the carrier is represented by:

$$\omega_R = (1+\rho)\omega_C - \rho\omega_S \quad (5)$$

The driving torque of the accessory pump 26 is supposed to be proportional to the rotational speed of the pump 26 as indicated in the following expression (6):

$$\tau_P = \alpha\omega_P \quad (6)$$

where $\tau_P$ represents load torque of the accessory pump 26 (<0), and $\omega_P$ represents rotational speed of the accessory pump 26, and α represents proportional coefficient (<0).

Assuming that the pump motor (i.e., drive motor for the air pump) 22 is operated to drive the accessory pump 26 as desired, and a vehicle speed and a required pump power (which can be calculated by a control unit not illustrated) are given, the following expressions (7) and (8) are derived from the above expression (6), where $\omega_{P1}$ represents the angular velocity of the drive motor 12, and Pp1 (<0) represents the required pump power:

$$P_{PI} = \tau_{PI}\omega_{PI} \qquad (7)$$
$$= \frac{1}{\alpha}\tau_{PI}^2$$
$$P_{PI} = \alpha\omega_{PI}^2 \qquad (8)$$

Accordingly, the following relationships (9), (10) are obtained:

$$\tau_{PI} = -\sqrt{\alpha Pp1} \quad (\tau_{PI} < 0) \qquad (9)$$
$$\omega_{PI} = \sqrt{\frac{Pp1}{\alpha}} \qquad (10)$$

According to the above-indicated expressions (3) and (4), the torque of the drive motor 12 and the torque of the pump motor 22 are expressed as follows:

$$\tau_R = -\frac{1}{1+\rho}\rho_C \qquad (11)$$
$$\tau_{PI} = -\frac{\rho}{1+\rho}\tau_C$$
$$\tau_C = -(1+\rho)\tau_{PI}$$

Using the above expressions, the following relationship (12) is obtained.

$$\tau_S = -\frac{\rho}{1+\rho}\tau_C \qquad (12)$$
$$= -\frac{\rho}{1+\rho}(-(1+\rho)\tau_{PI})$$
$$= \rho\tau_{PI}$$

Thus, the torque applied to each of the sun gear, carrier and the ring gear is determined.

In the meantime, the following relationships regarding the rotational speeds of the accessory pump 26 and the sun gear 20 are derived from the above-indicated expressions (5) and (10):

$$\omega_{PI} = (1+\rho)\omega_{CI} - \rho\omega_s \qquad (13)$$
$$\omega_s = \frac{1+\rho}{\rho}\omega_{CI} - \frac{1}{\rho}\omega_{PI}$$
$$= \frac{1+\rho}{\rho}\omega_{CI} - \frac{1}{\rho}\sqrt{\frac{Pp1}{\alpha}}$$

Using the above expressions (12) and (13), the power of the pump motor 22 is calculated as follows:

$$\tau_s\omega_s = \rho\tau_{PI}\left(\frac{1+\rho}{\rho}\omega_{CI} - \frac{1}{\rho}\sqrt{\frac{Pp1}{\alpha}}\right) \qquad (14)$$

-continued
$$= -\rho\sqrt{\alpha Pp1}\left(\frac{1+\rho}{\rho}\omega_{CI} - \frac{1}{\rho}\sqrt{\frac{Pp1}{\alpha}}\right)$$
$$= -P_{PI} - (1+\rho)\omega_{CI}\sqrt{\alpha Pp1}$$

Thus, the following expression (15) is obtained, where Ps represents the power of the pump motor 22:

$$P_S = -(1+\rho)\sqrt{\alpha Pp1}\,\omega_{CI} - P_{PI} \qquad (15)$$

Figure 4:
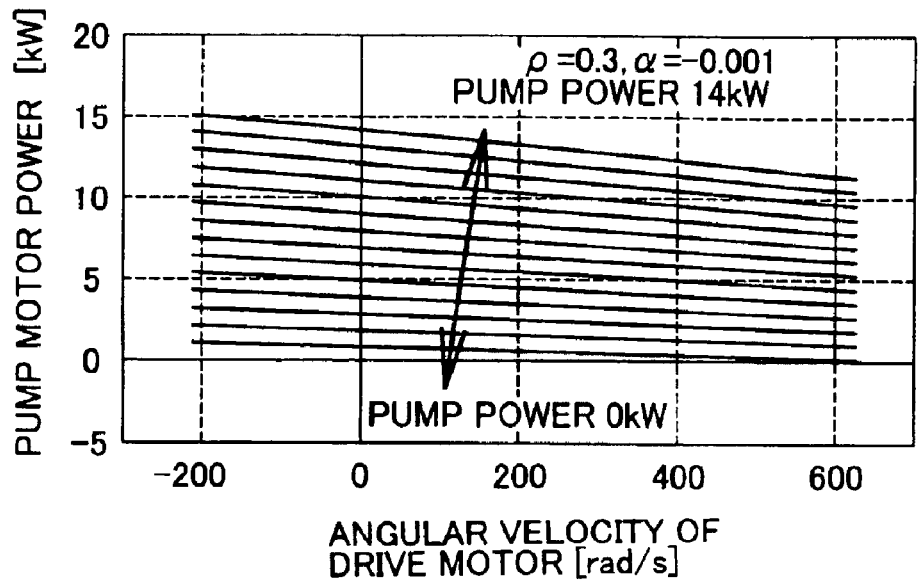
FIG. 4 is a graph showing a relationship between an angular velocity of a drive motor and power of a pump motor.

FIG. 4 shows a relationship (as indicated in the above expression (15)) between the angular velocity of the drive motor 12 and the power of the pump motor 22, using the power of the accessory pump 26 as a parameter. In FIG. 4, the horizontal axis represents the angular velocity of the drive motor 12, and the vertical axis represents the power of the pump motor 22. Here, the power of the pump motor 22 is represented by a straight line having an intercept of $-P_{P1}$ and a slope of $-(1+\rho)(\alpha P_p 1)^{0.5}$, with the intercept and slope varying with $P_{P1}$. The power of the pump motor 22 required for providing the same power of the accessory pump 26 is different between the case where the angular velocity of the drive motor 12 is equal to zero (i.e., where torque assist is not performed by the drive motor 12), and the case where the angular velocity of the drive motor 12 is not equal to zero (but, for example, is equal to 400 rad/s). It will be understood from FIG. 4 that the required power of the pump motor 22 decreases as the angular velocity of the drive motor 12 increases.

Figure 5:
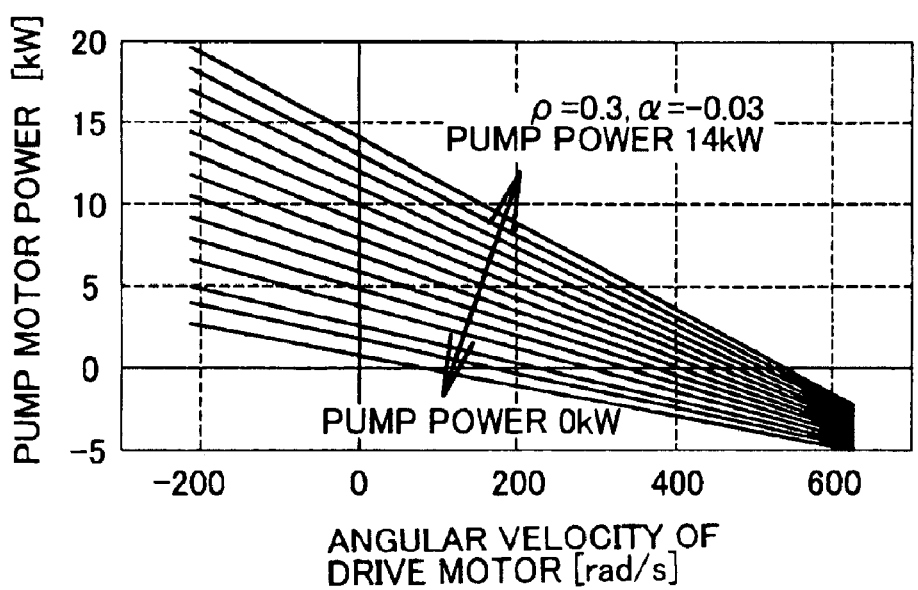
FIG. 5 is a graph showing a relationship between the angular velocity of the drive motor and the power of the pump motor.

It is possible to provide characteristics as shown in FIG. 5, by adjusting ρ (gear ratio) and α (proportional coefficient) in FIG. 4. The slope of each straight line in FIG. 5 is inclined more sharply than that of a corresponding line in FIG. 4, and a difference in the power of the pump motor 22 between the case where the angular velocity of the drive motor 12 is equal to zero and the case where it is not equal to zero becomes remarkable. It follows that, owing to the torque assist of the drive motor 12, the required power of the pump motor 22 decreases. By plotting the required power for driving the accessory pump 26 in relation to the angular velocity of the drive motor 12 in FIG. 5, a rated power of the pump motor 22 can be uniquely determined.

In operation, a target torque of the drive motor 12 is determined by adding torque obtained according to the above-indicated expression (11), to required torque to be transmitted to the output shaft connected to the wheels (i.e., torque for running the vehicle), and torque control is performed by a control unit (not shown), based on the target torque thus determined. On the other hand, torque control for the pump motor 22 is performed so that the rotational speed of the pump motor 22 (i.e., the sun gear) becomes equal to a target rotational speed that is determined according to the above-indicated expression (13).

In the present embodiment, therefore, the power to be generated by the pump motor 22 can be reduced with respect to the required power of the accessory pump 26 for driving the fuel cell system 10. Accordingly, the size of the pump motor 22 and that of an inverter or inverters can be advantageously reduced.

Further, the planetary gear unit, rather than a clutch, is used for transmitting a part of the power or driving force of the drive motor 12 to the accessory system, and therefore the accessory pump 26 can be efficiently driven with almost no loss of power.

Since the drive motor 12 used in the present embodiment is capable of generating sufficiently large toque, the size of the drive motor 12 or the capacity of the inverter(s) need not be increased even if extra torque is required for driving accessories.

While the accessory drive apparatus is installed on the fuel-cell vehicle in the illustrated embodiment, it is to be understood that the invention is not limited to this application, but may also be applied to any system equipped with an accessory system for driving a power source.

What is claimed is:

1. An accessory drive apparatus, comprising:

a power source;

an accessory system connected to provide an input to the power source;

an accessory driving source, wherein said power source comprises a first electric motor and said accessory driving source comprises a second electric motor; and a power combination/distribution mechanism that is driven by power created by the power source and is connect to the accessory system, wherein the power combination/distribution mechanism is adapted to transmit power to the accessory system from both the power source the accessory driving source, so that the accessory system is driven by a combination of power received from the accessory driving source and the power source.

2. The accessory drive apparatus according to claim 1, wherein:

the power source comprises a fuel cell system, and the first electric motor is coupled to the fuel cell system;

the accessory system comprises a pump that supplies fuel to the fuel cell system;

the second electric motor drives the pump; and a part of an output oft first electric motor is transmitted to the power combination/distribution mechanism.

3. The accessory drive apparatus according to claim 1, wherein:

the power combination/distribution mechanism comprises a planetary gear unit including a sun gear, a carrier, and a ring gear;

one of the accessory driving source and the accessory system is connected to the sun gear;

a part of the power from the power source is transmitted to the carrier; and the other of the accessory driving source and the accessory system is connected to the ring gear.

4. The accessory drive apparatus according to claim 3 wherein:

the power source comprises a fuel cell system, and the first electric motor is coupled to the fuel cell system;

the accessory system comprises a pump that supplies fuel to the fuel cell system;

the second electric motor drives the pump; and a part of an output of first electric motor is transmitted to the power combination/distribution mechanism.

5. An accessory drive apparatus, comprising:

a power source;

an accessory system connected to provide an input to the power source;

an accessory driving source, wherein said power source comprises a first electric motor and said accessory driving source comprises a second electric motor; and a planetary drive mechanism that is driven by power created by the power source and is connected to the accessory system, wherein the planetary drive mechanism is adapted to transmit power to the accessory system from both the power source and the accessory driving source, so that the accessory system is driven by a combination of power received from the accessory driving source and the power source.

6. The accessory drive apparatus according to claim 5, wherein:

the power source comprises a fuel cell system, and the first electric motor is coupled to the fuel cell system;

the accessory system comprises a pump that supplies fuel to the fuel cell system; and the second electric motor drives the pump.

7. An accessory drive apparatus, comprising:

a power source;

accessory means for providing an input to the power source;

means for driving the accessory means, wherein said power source comprises a first electric motor and said means for driving the accessory means comprises second electric motor; and planetary drive means for transmitting power to the accessory means from both the power source and the accessory means driving means.

8. The accessory drive apparatus according to claim 7, wherein:

the power source comprises a fuel cell system and a drive motor coupled to the fuel cell system;

the accessory means comprises a pump that supplies fuel to the fuel cell system; and the second electric motor drives the pump.

* * * * *